J. L. WILLIAMS & M. CARTER.
APPARATUS FOR TRANSMITTING POWER.
No. 181,296. Patented Aug. 22, 1876.
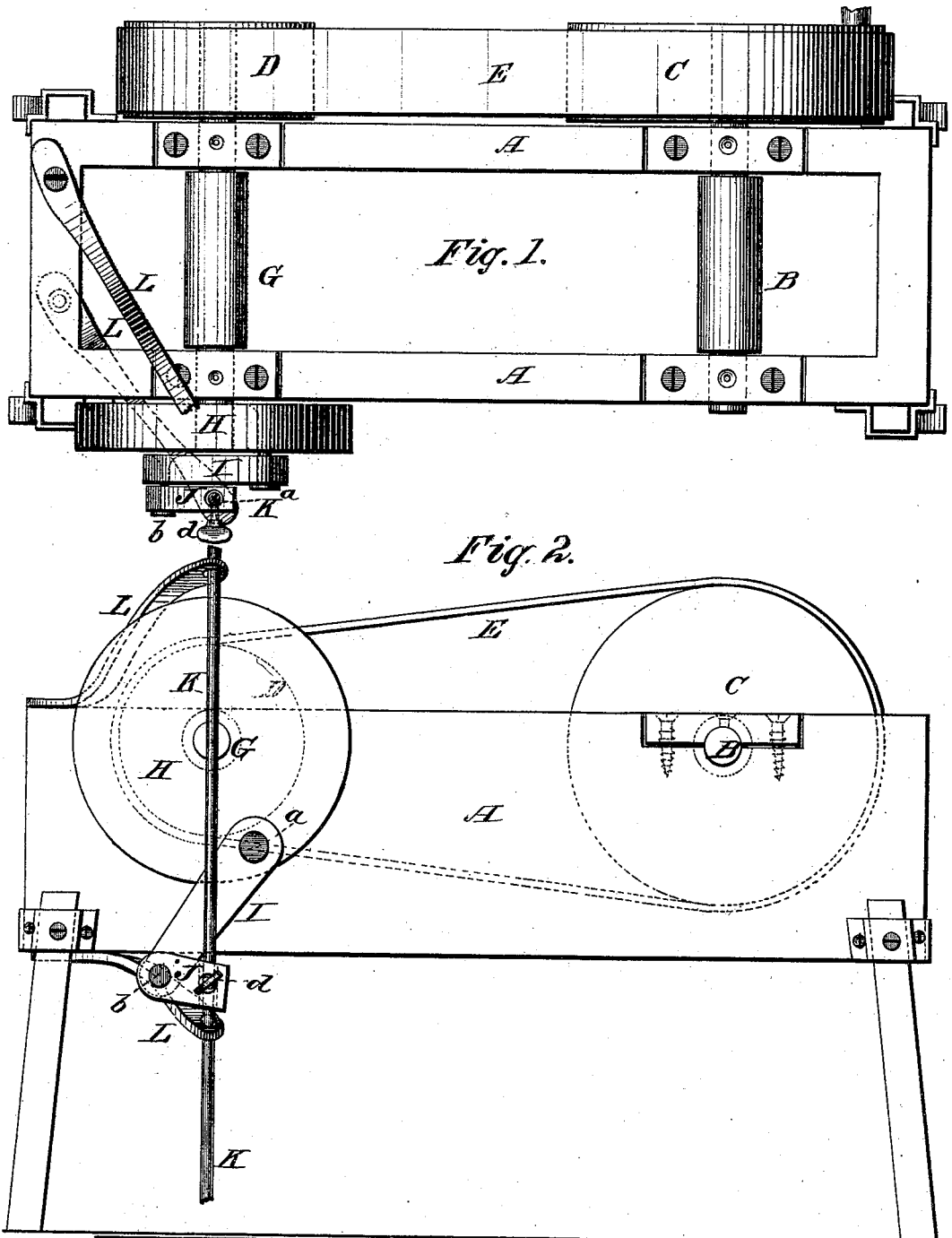

UNITED STATES PATENT OFFICE.

JOHN L. WILLIAMS AND MAC CARTER, OF JESUP, GEORGIA.

IMPROVEMENT IN APPARATUS FOR TRANSMITTING POWER.

Specification forming part of Letters Patent No. 181,296, dated August 22, 1876; application filed February 5, 1876.

*To all whom it may concern:*

Be it known that we, JOHN L. WILLIAMS and MAC CARTER, of Jesup, in the county of Wayne and State of Georgia, have invented certain new and useful Improvements in Apparatus for Transmitting Power; and we do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of our invention consists in the construction and arrangement of an apparatus for transmitting power, as will be hereinafter more fully set forth.

In the annexed drawing, Figure 1 is a plan view, and Fig. 2 is a side elevation.

A represents a rectangular frame of suitable dimensions, and supported upon legs inserted in staples fastened to the sides of the frame. Near one end of the frame is a shaft, B, provided at one end with a driving-pulley, C, operated by a crank. The pulley C is, by an endless belt, E, connected with a pulley, D, on the end of a shaft, G, near the other end of the frame. On the other end of the shaft G is a wheel, H, provided with a crank or wrist-pin, $a$, upon which is placed an arm, I. This arm has at its lower end, on the outer side, a pin, $b$, upon which is placed another arm, J, the whole forming, as it were, a triple crank upon the end of the shaft G. K is the vertical reciprocating rod passing through the end of the arm J, and fastened by a set-screw, $d$, said arm passing also through guides L L attached to the frame A above and below the point of connection with the crank.

This apparatus for transmitting power is simple in construction, light running, and cheap, and anybody can easily make one that will run very light at a trifling cost.

Having thus fully described our invention, what we claim as new, and desire to secure by Letters Patent, is—

The triple crank H I J, crank-pin $a$, in combination with the vertical reciprocating rod K, set-screw $d$, guides L, and the pin $b$, all constructed and arranged as and for the purposes specified.

In testimony that we claim the foregoing as our own we affix our signatures in presence of two witnesses.

JOHN L. WILLIAMS.
MAC CARTER.

Witnesses:
J. CRONIN,
A. M. IVES.